(12) United States Patent
Wang et al.

(10) Patent No.: US 9,330,491 B2
(45) Date of Patent: *May 3, 2016

(54) CONTEXT CONSTRAINED NOVEL VIEW INTERPOLATION

(71) Applicant: Seiko Epson Corporation, Tokyo (JP)

(72) Inventors: Xianwang Wang, Santa Clara, CA (US); Jing Xiao, Cupertino, CA (US)

(73) Assignee: Seiko Epson Corporation, Tokyo (JP)

( * ) Notice: Subject to any disclaimer, the term of this patent is extended or adjusted under 35 U.S.C. 154(b) by 102 days.

This patent is subject to a terminal disclaimer.

(21) Appl. No.: 14/283,489

(22) Filed: May 21, 2014

(65) Prior Publication Data

US 2014/0253554 A1    Sep. 11, 2014

Related U.S. Application Data

(63) Continuation of application No. 12/814,920, filed on Jun. 14, 2010, now Pat. No. 8,817,071.

(60) Provisional application No. 61/262,015, filed on Nov. 17, 2009.

(51) Int. Cl.
*G06T 15/20*   (2011.01)
*G06T 7/40*    (2006.01)
(Continued)

(52) U.S. Cl.
CPC ............. *G06T 15/205* (2013.01); *G06T 7/0022* (2013.01); *G06T 7/408* (2013.01); *G06T 17/00* (2013.01); *H04N 13/0011* (2013.01); *G06T 2207/20228* (2013.01); *H04N 13/0242* (2013.01)

(58) Field of Classification Search
CPC ..... G06T 15/205; G06T 7/408; G06T 7/0022; G06T 17/00; G06T 2207/20228; G06T 15/20; G06T 7/40; H04N 13/0011; H04N 13/0242; H04N 13/0055; H04N 19/00769; H04N 13/0239; H04N 13/0059; H04N 13/0048; H04N 13/0296; H04N 13/0497
USPC ............................... 348/43, 46; 382/131, 135
See application file for complete search history.

(56) References Cited

U.S. PATENT DOCUMENTS 5,173,949 A * 12/1992 Peregrim ............ G01S 13/9035
                                                     382/209
6,034,717 A    3/2000 Dentinger et al.
(Continued)

FOREIGN PATENT DOCUMENTS

JP    2003-006618 A    1/2003
JP    2009-014628 A    1/2009
(Continued)

OTHER PUBLICATIONS

I. Skrypnyk and D. G. Lowe, "Scene Modelling, Recognition and Tracking with Invariant Image features", Proc. the Third Int'l Symp. on Mixed and Augmented Reality (ISMAR04), pp. 110-119, 2004.*

(Continued)

*Primary Examiner* — Sath V Perungavoor
*Assistant Examiner* — Howard D Brown, Jr.

(57) ABSTRACT

Aspects of the present invention include systems and methods for generating a novel view interpolation. In embodiments, feature correspondences and geometrical contexts are used to find additional correspondences based on the assumption of the local linear transformation. The accuracy and the number of correspondence matches may be improved by iterative refinement. Having obtained a set of correspondences, a novel view image can be generated.

14 Claims, 14 Drawing Sheets

(51) Int. Cl.

| | |
|---|---|
| *G06T 7/00* | (2006.01) |
| *G06T 17/00* | (2006.01) |
| *H04N 13/00* | (2006.01) |
| *H04N 17/02* | (2006.01) |
| *G06K 9/00* | (2006.01) |
| *H04N 13/02* | (2006.01) |

(56) References Cited

U.S. PATENT DOCUMENTS

| | | | |
|---|---|---|---|
| 6,658,145 | B1 | 12/2003 | Silver et al. |
| 7,664,316 | B2 | 2/2010 | Aoki |
| 7,714,912 | B2 | 5/2010 | Faisman et al. |
| 2002/0081019 | A1* | 6/2002 | Katayama ............ G06K 9/209 382/154 |
| 2004/0046885 | A1* | 3/2004 | Regan ............ H04N 5/23293 348/333.11 |
| 2005/0237324 | A1* | 10/2005 | Guhring ............ G06T 15/08 345/419 |
| 2006/0044409 | A1 | 3/2006 | Aoki |
| 2006/0221072 | A1 | 10/2006 | Se et al. |
| 2007/0110338 | A1 | 5/2007 | Snavely et al. |
| 2007/0285419 | A1 | 12/2007 | Givon |
| 2008/0198924 | A1 | 8/2008 | Ho et al. |
| 2008/0253685 | A1* | 10/2008 | Kuranov ............ G06T 3/4038 382/284 |
| 2008/0263012 | A1* | 10/2008 | Jones ............ G06F 17/30811 |
| 2008/0284864 | A1* | 11/2008 | Kotake ............ G06K 9/3216 348/222.1 |
| 2008/0310757 | A1 | 12/2008 | Wolberg et al. |
| 2009/0073265 | A1 | 3/2009 | Greenhill et al. |
| 2009/0110239 | A1 | 4/2009 | Chen et al. |
| 2009/0122195 | A1 | 5/2009 | van Baar et al. |
| 2009/0175497 | A1 | 7/2009 | Anai et al. |
| 2009/0175498 | A1 | 7/2009 | Kochi et al. |
| 2009/0259102 | A1 | 10/2009 | Koninckx et al. |
| 2009/0262206 | A1 | 10/2009 | Park |
| 2010/0315547 | A1* | 12/2010 | Takada ............ H04N 19/503 348/416.1 |
| 2011/0002550 | A1* | 1/2011 | Takada ............ G06T 7/2013 382/218 |
| 2011/0026598 | A1* | 2/2011 | Takada ............ H04N 19/56 375/240.16 |
| 2011/0115921 | A1* | 5/2011 | Wang ............ G06T 7/0022 348/187 |
| 2011/0255775 | A1* | 10/2011 | McNamer ............ G06T 7/0075 382/154 |
| 2012/0162374 | A1* | 6/2012 | Markas ............ H04N 13/0221 348/46 |
| 2012/0236133 | A1* | 9/2012 | Gallagher ............ H04N 13/0018 348/60 |
| 2013/0329015 | A1* | 12/2013 | Pulli ............ G06T 7/0075 348/47 |

FOREIGN PATENT DOCUMENTS

| | | |
|---|---|---|
| JP | 2009-116532 A | 5/2009 |
| WO | 2008/134829 A2 | 11/2008 |
| WO | 2009/008864 A1 | 1/2009 |

OTHER PUBLICATIONS

Lowe, D., "Local Feature View Clustering for 3D Object Recognition", Proc. of the IEEE Conference on Computer Vision and Pattern Recognition, 2001.
Jarusirisawad, S., et al., "Signal Processing: Image Communication", 3DTV View Generation Using Uncalibrated Pure Rotating and Zooming Cameras, 2009, vol. 24, No. 1-2, SI (JAN), pp. 17-30.
Lowe, D., "Distinctive Image Features from Scale-Invariant Keypoints", International Journal of Computer Vision, 2004.
Singhal, A., et al., "Probabilistic Spatial Context Models for Scene Content Understanding", Proceedings of the 2003 IEEE Conference on Computer Vision and Pattern Recognition, (CVPR'03).
Strecha, C., et al., "Wide-Baseline Stereo from Multiple Views" a Probabilistic Account, Proceedings of the 2004 IEEE Computer Society Conference on Computer Vision and Pattern Recognition (CVPR'04).
Torralba, A., et al., "Contextual Models for Object Detection Using Boosted Random Fields", Massachusetts Institute of Technology—computer science and artificial intelligence laboratory, Jun. 2004.
Tu, Z., "Auto-Context and Its Application to High-Level Vision Tasks", Proceedings of IEEE Conference on Computer Vision and Pattern Recognition, 2008.
Wolf, L., et al., "A Critical View of Context", International Journal of Computer Vision, Springer Science + Business Media, LLC, 69(2): pp. 251-261, 2006.
Woodford, O.J., et al., "Efficient New-View Synthesis Using Pairwise Dictionary Priors", Proceedings of IEEE Conference on Computer Vision and Pattern Recognition, Jun. 2007.
Woodford, O.J., et al., "Fields of Experts for Image-Based Rendering", British Machine Vision Conference, pp. 860-867, 2006.
Woodford, O.J., et al., "On New View Synthesis Using Multiview Stereo", British Machine Vision Conference, pp. 1120-1129, 2007.
Wu, Y., et al., "Contextual Flow", Proceedings of the IEEE Conference on Computer Vision and Pattern Recognition, Jun. 2009.
Yang, M., et al., "Context-Aware Visual Tracking", IEEE Transactions on Pattern Analysis and Machine Intelligence, vol. 31, No. 7, Jul. 2009.
Zass, R., et al., "Probabilistic Graph and Hypergraph Matching", Proceedings of IEEE Conference on Computer Vision and Pattern Recognition, 2008.
Sato, T., et al., "Matching Three or More Images by Trifocal Tensor", Information Processing Conference, vol. 96, No. 86, pp. 41-48, Sep. 12, 1996.
Ueda, M, et al., "Real-Time Free-viewpoint Video Generation Based on 3D Shape Reconstruction: Toward High-Fidelity Video Generation" IPSJ SIG Technical Report, 2006-CVIM-153, pp. 69-76, Mar. 16, 2006.
Iida, R., et al., "A Method to Synthesize an Image of Virtual View from Stereo Images Using Plane Homography", Information Processing Conference, vol. 99, No. 3, pp. 73-80, Jan. 22, 1999.
Berg, A.C., et al., "Shape Matching and Object Recognition using Low Distortion Correspondences", Proc. of IEEE Conf. on Computer Vision and Pattern Recognition, 2005.
Buehler, C., et al., "Unstructured Lumigraph Rendering", Proc. of ACM SIGGRAPH, 2001.
Canny, J., "A Computational Approach to Edge Detection", IEEE Transactions on Pattern Analysis and Machine Intelligence, vol. PAMI-8, No. 6, Nov. 1986.
Criminisi, A., et al., "Effcient Dense Stereo with Occlusions for New View-Synthesis by Four-State Dynamic Programming", International Journal of Computer Vision, vol. 71, Issue 1, Jan. 2007.
Debevec, P., et al., "Efficient View-Dependent Image-Based Rendering with Projective Texture-Mapping", University of California at Berkeley, CA, Technical Report: CSD-98-1003, Year of Publication: 1998.
Devillers, O., "Improved Incremental Randomized Delaunay Triangulation", In the Fourteenth Annual Symposium on Computational Geometry, pp. 106-115, 1998.
Fitzgibbon, A., et al., "Image-Based Rendering Using Image-Based Priors", International Journal of Computer Vision and Pattern Recognition, 63(2), pp. 141-151, 2005.
Hirschmuller, H., et al., "Evaluation of Cost Functions for Stereo Matching", Proc. of IEEE Conference on Computer Vision and Pattern Recognition, pp. 1-8, Jun. 2007.
Hoiem, D., et al., "Putting Objects in Perspective", International Journal of Computer Vision, vol. 80, No. 1, Oct. 2008.
Leordeanu, M., et al., "A Spectral Technique for Correspondence Problems Using Pairwise Constraints", Proceedings of the Tenth IEEE International Conference on Computer Vision, vol. 2, 2005.
Levoy, M., et al., "Light Field Rendering", Proceedings of the ACM SIGGRAPH, pp. 31-42, 1996.
Li, W. et al., "Joint Conditional Random Field of Multiple Views with Online Learning for Image-Based Rendering", Proceedings of IEEE Conference on Computer Vision and Pattern Recognition, pp. 1-8, Jun. 2008.

(56) References Cited

OTHER PUBLICATIONS

Mark, W., et al., "Post-Rendering 3D Warping", In Proceedings of 1997 Symposium on Interactive 3D Graphics, Providence, RI, pp. 7-16, Apr. 27-30, 1997.

Oliva, A., et al., "The Role of Context in Object Recognition", Trends in Cognitive Sciences, vol. 11, No. 12, pp. 520-527, Dec. 2007.

Rabinovich, A., et al., "Objects in Context", Proceedings of the International Conference on Computer Vision, 2007.

Shade, J., et al., "Layered Depth Images", Proceedings of ACM SIGGRAPH, pp. 231-242, 1998.

Shahrokni, A., et al., "Temporal Priors for Novel Video Synthesis", Proceedings of the 8th Asian conference on Computer vision—vol. Part II, pp. 601-610, Springer-Verlag, 2007.

Shotton, J., et al., "TextonBoost: Joint Appearance, Shape and Context Modeling for Multi-Class Object Recognition and Segmentation", Proceedings of Europ. Conf. on Computer Vision, pp. 1-15, 2006.

Shum, H., et al., "A Review of Image-Based Rendering Techniques", IEEE/SPIE Visual Communications and Image Processing, pp. 2-13, 2000.

* cited by examiner

CONTEXT CONSTRAINED NOVEL VIEW INTERPOLATION

CROSS-REFERENCE TO RELATED APPLICATION

This application is a continuation of, and claims priority under 35 U.S.C. §120 on, U.S. application Ser. No. 12/814,920, filed on Jun. 14, 2010, which claims priority under 35 U.S.C. §119e on U.S. application No. 61/262,015 filed on Nov. 17, 2009. The content of each such related application is incorporated by reference herein in its entirety.

BACKGROUND

A. Technical Field

The present invention pertains generally to camera or vision systems; and relates more particularly to generating novel views of a scene.

B. Background

Novel view interpolation (NVI) deals with trying to interpolate or synthesize a new, or novel, image view from other views. There are a wide range of approaches to synthesize new views, which may be classified into three general categories: NVI without geometry, NVI with explicit geometry, and NVI with implicit geometry.

Light field rendering belongs to the first category. It makes no assumption of the scene geometry, but a large number of cameras are used to capture the input images, which limits its application.

The methods in the second category produce a virtual view by projecting pixels from all of the reference images. Therefore, the methods of this category require accurate geometry to synthesize the novel view. The typical methods of this category include view-dependent texture-mapping, 3D warping, layered-depth images, and wide-baseline stereo. These methods generally adopt stereo matching to obtain the accurate geometry, which is a significant challenge in the field of stereo vision.

NVI with implicit geometry tries to find a trade-off between the first and second categories, demanding less images and requiring less accurate geometry. The novel view and its depth are simultaneously estimated in the methods of this category. Methods of this category model NVI as a maximum likelihood estimation (MLE) problem. Because it is poorly constrained, a powerful prior is needed to obtain a good solution. For example, a texture dictionary has been used as the prior in a Markov Random Field (MRF) model. This work has been extended by using different priors, field of experts, and pairwise dictionaries. These methods have the disadvantage of the independent assumption over the observed data. Conditional Random Field (CRF)-based NVI methods have been suggested to remove this limitation. These methods appear to yield good results, but the input images are always of high quality. Current algorithms of this category tend to focus on the occlusion problem, with some attention on the effect of large view changes on NVI. No research work has been explored in the other complex scenes, for example, radiometric variation, textureless, and non-Lambertian surfaces.

Although there are several novel view interpolation algorithms that attempt to extract information from other views in order to generate a novel view, the several challenges presented by complex scenes have traditionally been a barrier to good novel view interpolation. These challenges include but are not limited to, ill-positioned pose, transparency within the scene, occlusion, deformation, lighting, and large view changes. Furthermore, novel view interpolation in complex scenes can suffer from several other issues, include by way of example, radiometric variation, textureless and non-Lambertian surfaces, and complicated structures (e.g., hair, trees, etc.). These difficult scenarios cannot provide reliable information for point correspondences, and typically generate a large number of false positive matches. While these specialized methods for NVI may be used to address one or two of these difficult scenarios, their inherent weaknesses make them unsuitable in other scenarios.

Because scenes can contain or suffer from one or more of these challenges, it is difficult to correctly interpolate a new view of a scene. Accordingly, what is needed is a more robust system that can generate a novel view of a scene.

SUMMARY OF THE INVENTION

To alleviate the aforementioned limitations, presented herein are context-constrained novel view interpolation systems and methods.

In embodiments, context of a pixel of one image is represented by geometric constraints on the locations of its nearby features observed in its spatial contextual domain. The geometric constraints of this pixel can be used to estimate the location of its correspondences in other views, based on the assumption of a transformation among the locations of correspondences in a local patch.

In embodiments, the correspondences are verified by using three-dimensional reconstruction. If the three-dimensional reconstruction yields points with acceptable errors, the correspondences are added to the set of feature correspondences.

In embodiments, the process of finding more feature correspondences can be iterated to increase the number of correspondences and accuracy of the correspondences. Thus, in embodiments, a coarse-to-fine mechanism is used to establish the dense correspondences and improve the accuracy of stereo matching among views by reconstruction verification.

Given a set of correspondences, a novel view may be interpolated. In embodiments, weighting factors for combining the pixel color values from pixels identified in the source images can be determine using angles measured between a ray projected from the pixel in the novel view image to an intersection point on a three-dimensional mesh and rays projected from the intersection point to the source images.

The methods presented herein may be contained in a computer program product comprising at least one computer-readable medium storing one or more sequences of instructions, wherein execution of the one or more sequences of instructions by one or more processors causes the one or more processors to execute a computer-implemented method for calibrating a projector system. Embodiments of the present invention include a computer system or systems for generating a novel view image.

Some features and advantages of the invention have been generally described in this summary section; however, additional features, advantages, and embodiments are presented herein or will be apparent to one of ordinary skill in the art in view of the drawings, specification, and claims hereof. Accordingly, it should be understood that the scope of the invention shall not be limited by the particular embodiments disclosed in this summary section.

BRIEF DESCRIPTION OF THE DRAWINGS

Reference will be made to embodiments of the invention, examples of which may be illustrated in the accompanying figures. These figures are intended to be illustrative, not limiting. Although the invention is generally described in the context of these embodiments, it should be understood that it is not intended to limit the scope of the invention to these particular embodiments.

DETAILED DESCRIPTION OF THE PREFERRED EMBODIMENTS

Figure 1:
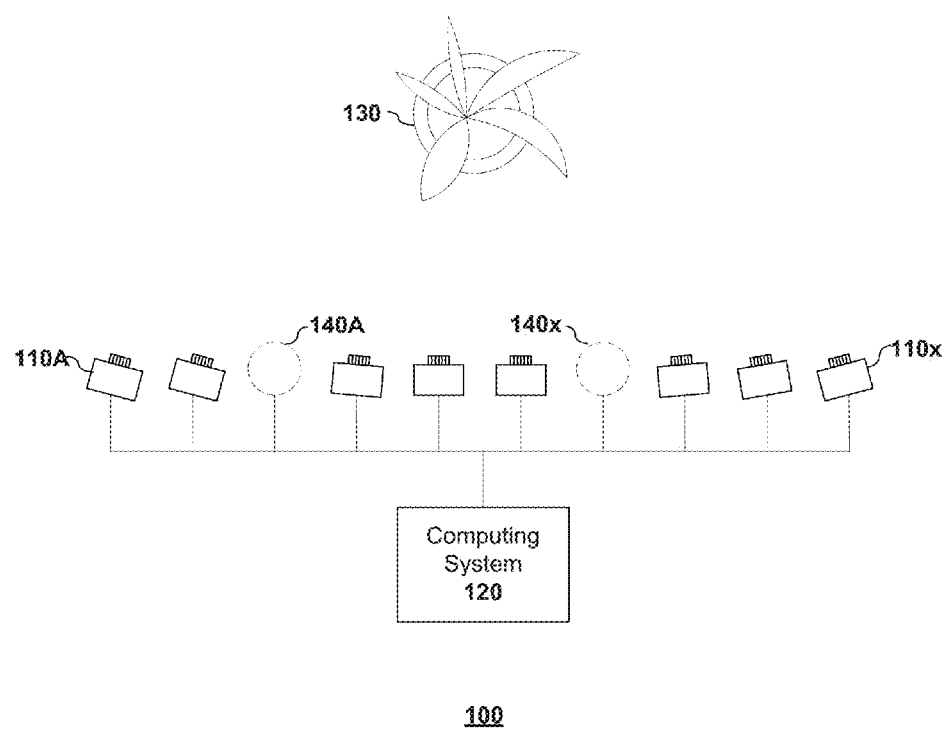
FIG. 1 illustrates a camera system for novel view interpolation according to various embodiments of the invention.

In the following description, for purpose of explanation, specific details are set forth in order to provide an understanding of the invention. It will be apparent, however, to one skilled in the art that the invention may be practiced without these details. One skilled in the art will recognize that embodiments of the present invention, some of which are described below, may be incorporated into a number of different systems and devices, including by way of illustration and not limitation, cameras (video and/or still image), multimedia systems, theater systems, video conference systems, projection systems, gaming systems, computer systems, vision systems, and the like. Aspects of the present invention may be implemented in software, hardware, firmware, or combinations thereof.

Components, or modules, shown in block diagrams are illustrative of exemplary embodiments of the invention and are meant to avoid obscuring the invention. It shall also be understood that throughout this discussion that components may be described as separate functional units, which may comprise sub-units, but those skilled in the art will recognize that the various components, or portions thereof, may be divided into separate components or may be integrated together, including integrated within a single system or component.

Furthermore, connections between components/modules within the figures are not intended to be limited to direct connections. Rather, data between these components may be modified, re-formatted, or otherwise changed by intermediary components. Also, additional or fewer connections may be used. It shall also be noted that the terms "coupled" or "communicatively coupled" shall be understood to include direct connections, indirect connections through one or more intermediary devices, and wireless connections.

Reference in the specification to "one embodiment," "an embodiment," or "embodiments," means that a particular feature, structure, characteristic, or function described in connection with the embodiment or embodiments is included in at least one embodiment of the invention and may be in more than one embodiment. The appearances of the phrase "in one embodiment," or "in an embodiment," or "in embodiments," in various places in the specification are not necessarily all referring to the same embodiment or embodiments.

A. Overview

Presented herein are systems and methods for novel view interpolation (NVI) from a small set of input images of complex scenes. This patent document presents embodiments of systems and methods that provide frameworks that incorporate contextual information to constrain view interpolation.

Although context has not previously been utilized in novel view interpolation, visual context has played an important role in object recognition, object detection, segmentation, tracking, and scene understanding. It has been shown that contextual methods to model the spatial structure can be roughly subdivided into three categories: structure-stiff model, structure-free model, and structure-flexible model. The structure-stiff models enforce strict spatial configuration in the image pixels or patches around the region of interest, for example, image templates. It tends to have high accuracy in matching, but strong insensitivity to occlusion, and deformation. Structure-free models neglect the spatial relations, e.g., a bag of features or feature histograms. They provide the flexibility of modeling the complex scenes, but can result in false positive matching and distraction. Structure-flexible models aim to capture the coarse geometric structure of a scene and allow certain deformation in the spatial configurations, such as shape context and random graphs. Although context modeling historically has drawbacks, an aspect of the present invention is utilizing context to help extract information for novel view interpolation.

Novel view interpolation (NVI) is typically an algorithmic component of computer vision-based applications, such as, multi-view image/video compression, eye-gaze correction, and multi-view three-dimensional displays. Novel view interpolation algorithms generally first establish correspondences among views, and then a new view can be synthesized based on the corresponding intensities. Hence, stereo matching is typically an important component and one of the core challenges in NVI. The choice of matching cost decides the performance of stereo algorithm. Various matching costs have been previously evaluated. For the scenes where the texture images are of high quality, simple matching costs such as pixel difference of intensities, or correlation over small windows work well in the reconstruction with enforcement of spatial consistency. While efficiently dealing with occlusion, the methods of using small patches can suffer from illumination variation, repetitive patterns, textureless surfaces, and non-Lambertian surfaces. On the other hand, the methods based on larger neighborhood have difficulties in large viewpoint changes and partial occlusion. These variations often occur in the complex scenes of real world and invalidate the stereo matching algorithms. Therefore, robust stereo matching methods are needed to handle these problems in NVI.

It has been shown that none of the matching costs are very robust to strong local variations. The root of such limitation is that any pixel is considered alone, regardless of the pixels in its vicinity. As a result, false positive correspondences may be good matches, and good matches do not necessarily correspond to the true matches. Seldom is a pixel isolated and independent to the entire scene, no matter how complicated the scene is. For example, one pixel may experience a large variation in its intensity because of occlusion or illumination changes among the input images, but its context (such as nearby features) may be more stable and undergo much less significant changes. Thus, because the spatial context provides additional verification, the contextual information can be used advantageously in an efficient way to improve the robustness to find correspondences.

In embodiments, context-constrained NVI systems and methods are presented herein. In embodiments, one individual context of a pixel of one image is represented by geometric constraints on the locations of its nearby Affine features observed in its spatial contextual domain. The geometric constraints of this pixel can be used to estimate the location of its correspondences in other views, based on the assumption of a transformation among the locations of correspondences in a local patch. In embodiments, the Affine features correlated to this pixel may be very sparse, and the size of the neighborhood window may be increased to incorporate more features, which contradicts the local linear assumption. Therefore, in embodiments, a coarse-to-fine mechanism is used to establish the dense correspondences and improve the accuracy of stereo matching among views by reconstruction verification.

Advantages of embodiments of the systems and methods presented herein, include but are not limited to: (1) providing techniques to establish point dense and accurate correspondences among views; (2) providing approaches that incorporate contexts to constrain the feature's correspondences, going from matching local brightness to matching geometric context for NVI; and (3) providing more robust correspondences—since the context is significantly insensitive to small local appearance changes, matching context leads to more robust correspondences. Accordingly, embodiments of the present invention can be used for novel view interpolation even when the input images are of complex scenes.

B. Method Embodiments

1. Overview

FIG. 1 depicts a system 100 configuration according to embodiments of the present invention. The system 100 comprises a set of cameras 110x coupled to a computing system 120. The cameras 110x are positioned to capture images from different views of a scene 130. It is noted that discussions herein referring to cameras shall be construed to cover both a plurality of cameras at unique positions, one or more cameras moved to different positions to capture multiple view images, or a combination thereof. It shall also be noted that references to a camera shall be construed to cover camera views or camera images, as the context allows. It is also noted that the camera positions do not need to be evenly or linearly positioned.

As shown in FIG. 1, there are positions, 140A-x, at which there is no captured camera image. If an image from that view is desired, embodiments of the present invention can render a novel view image to approximate what a captured image from that position would look like had a camera been positioned to capture the view image.

In embodiments, the computing system 120 interfaces with the cameras to coordinate the capturing and storing of the images from the cameras. In embodiments, computing system also generates the novel view image or images. An embodiment of computing system 120 will be described in more detail below.

Figure 2:
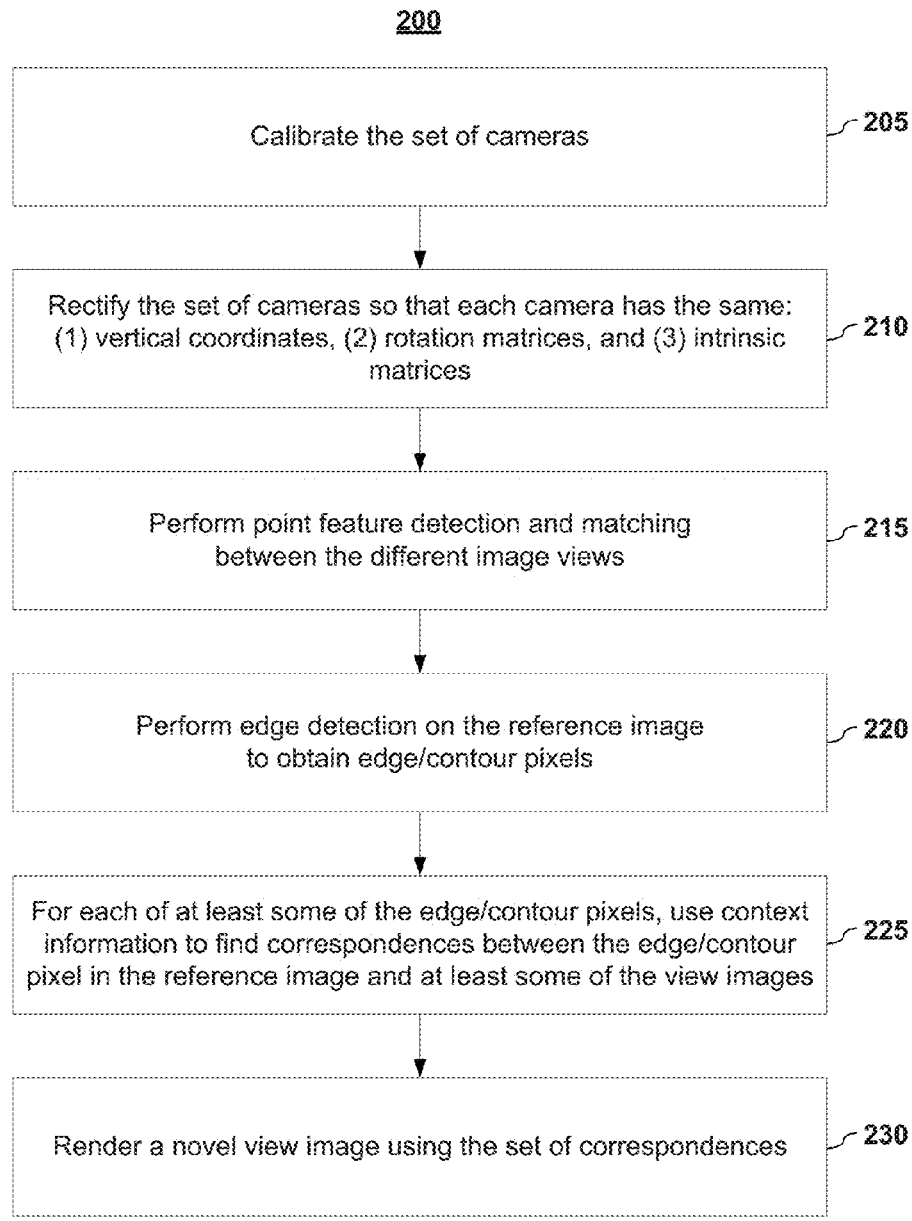
FIG. 2 presents a method for generating one or more novel views according to various embodiments of the invention.

FIG. 2 presents a method for generating one or more novel views according to various embodiments of the invention. In embodiments, the set of cameras are calibrated (205) and the intrinsic parameters, focal length, image center, and distortion information are obtained. Also, in embodiments, stereo calibration is performed (205) to obtain the extrinsic parameters of the cameras relative to a reference camera. It shall be noted that camera calibration is well known to those of ordinary skill in the art and that calibration tools or toolboxes that perform camera calibration are readily available.

In the depicted embodiment, the set of cameras are rectified (210), which is well known to those of ordinary skill in the art. In embodiments, the cameras are rectified by extending the stereo pairs to the different views. As a result, there is a transformation matrix and a projection matrix for each of the views. After rectification, each view has the same vertical coordinates, the same rotation matrices, and the same intrinsic matrices.

The following equation sets are provided for the purpose of illustrating the rectification of four camera views with camera view 2 being the reference image view:

$$v_1 = c_1 - c_2;$$
$$v_2 = \text{cross}(R_2(3,:)', v_1); \Rightarrow R_n = \begin{bmatrix} v_1'/\text{norm}(v_1) \\ v_2'/\text{norm}(v_2) \\ v_3'/\text{norm}(v_3) \end{bmatrix}$$
$$v_3 = \text{cross}(v_1, v_2);$$

Eq. Set (1)

where:
$c_i$=optical center of camera i;
$R_2$=the rotation matrix of camera 2; and
$v_i'$ is the transpose of $v_i$.
Thus:
$v_1$=the baseline between camera 1 and 2 (new x axis (baseline, from c1 to c2));
$v_2$=the cross product of $v_1$ and Row 3 of $R_2$ (new y axes (orthogonal to old z and new x)); and
$v_3$=the cross product of $v_1$ and $v_2$ (new z axes (orthogonal to baseline and y)).

$$K_n = (K_{o1} + K_{o2} + K_{o3} + K_{o4})/4;$$

Eq. Set (2)

where $K_n$ represents the new intrinsic parameters matrices for all the camera and $K_{oi}$ represents the old intrinsic matrix of camera i.

$$\begin{aligned} P_{o1} &= K_{o1}[R_{o1}| - R_{o1}c_1] & P_{n1} &= K_n[R_n| - R_n c_1] \\ P_{o2} &= K_{o2}[R_{o2}| - R_{o2}c_2] & P_{n2} &= K_n[R_n| - R_n c_2] \\ P_{o3} &= K_{o3}[R_{o3}| - R_{o3}c_3] & \Rightarrow & P_{n3} &= K_n[R_n| - R_n c_3] \\ P_{o4} &= K_{o4}[R_{o4}| - R_{o4}c_4] & P_{n4} &= K_n[R_n| - R_n c_4] \end{aligned}$$

Eq. Set (3)

where:
$R_{oi}$=the rotation matrix of camera i;
$c_i$=the optical center of camera i;
$P_{oi}$=the old projection matrix of camera i;

$R_n$=the new rotation matrix of all the cameras (all the cameras have the same rotation matrix); and $P_{ni}$=the new projection matrix of camera i.

$$T_1 = K_n R_n (K_{o1} R_{o1})^{-1}$$
$$T_2 = K_n R_n (K_{o2} R_{o2})^{-1}$$  Eq. Set (4)
$$T_3 = K_n R_n (K_{o3} R_{o3})^{-1}$$
$$T_4 = K_n R_n (K_{o4} R_{o4})^{-1}$$

where $T_i$=the image transformation matrix of camera i used to rectify the images from camera i.

After calibration, there is a set of calibrated input images, $I_1, \ldots, I_n$ in which $I_i(x,y)$ is the color at pixel (x,y) of the $i^{th}$ image. The images are taken by cameras in different positions represented by 3×4 projection matrices $P_1$ to $P_n$, which are known. The projection matrix P projects homogenous three-dimensional (3D) points X to homogenous two-dimensional (2D) points $x=\lambda(x,y,1)^T$ linearly: x=PX. The task of NVI is to generate a new view, $I_v$, of a scene, which would be seen by a virtual camera in a position not in the original set. Specifically, we need to compute the color of each pixel in $I_v$, i.e., $I_v(x,y)$.

Figure 3:
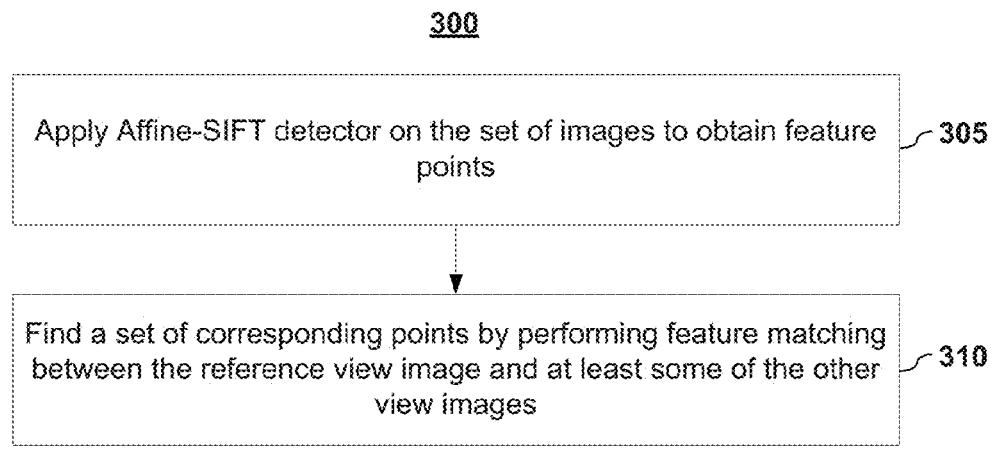
FIG. 3 depicts a method for obtaining a set of correspondences between a reference image of a scene taken from one view and one or more images taken from different views of the scene according to various embodiments of the invention.

The next step in the depicted embodiment 200 of FIG. 2 of context-based NVI generation is to perform (215) point feature detection and matching between the different camera views. FIG. 3 depicts a method for performing point feature detection and matching between the different camera views according to various embodiments and will be presented below.

Although the prior step (215) results in a set of correspondences between the reference image and the other images, some of the feature matches may not be useful for generating a novel view image and there may not be enough correspondences. Thus, it is beneficial to obtain additional correspondences to add to the set of correspondences to improve the resultant rendered novel view image.

Additional correspondences may be obtained by using context information. In embodiments, the additional set of correspondences are obtained by performing (220) edge detection on the reference image to identify the edge and contour pixels. For each pixel in the edge/contours of the reference image, $I_r$, additional correspondences can be established from the other views, $I_q$, where q=1 . . . n, q≠r, by using (225) context information to find correspondences between edge/contour pixels in the reference image and at least some of the other view images. In embodiments, the correspondences may be refined to improve the accuracy of correspondences and decreases the reconstruction error.

Finally, given a set of correspondences, a novel view image may be generated (230). In embodiments, an unstructured lumigraph rendering is used to interpolate the new views, although one skilled in the art will recognize that other rendering methods may be employed.

2. Feature Detection and Matching

FIG. 3 depicts a method 300 for obtaining a set of correspondences between a reference image of a scene taken from one view and one or more images taken from different views of the scene according to various embodiments of the invention. In embodiments, an Affine-SIFT (scale-invariant feature transform) detection is applied (305) to the images. It should be noted that other feature detection methods may be used, such as by way of example and not limitation, SIFT (Scale-Invariant Feature Transform), SURF (Speeded-Up Robust Features), GLOH (Gradient Location and Orientation Histogram), or PHOG (Pyramid Histogram of Oriented Gradients). However, as compared to a SIFT detector, an Affine-SIFT detector is typically more robust to rotation, translation, zoom, deformation, and illumination changes and tends to find more features. In embodiments, the Affine-SIFT features are extracted from the images, $I_1, \ldots, I_n$, and the features from other images are matched (310) to the features from the reference image, $I_r$, using a matching algorithm. In embodiments, the matching algorithm may be that as presented by David G. Lowe, in "Distinctive Image Features from Scale-Invariant Keypoints," *Int. J. of Computer Vision,* 60:91-110 (2004), which is incorporated herein by reference in its entirety. However, those skilled in the art shall recognize that other matching methods may be employed to find a set of corresponding points between the reference view image and at least some of the other view images.

In embodiments, the feature correspondences may be found as follows. In embodiments, two local patches, a model patch $Y_m^r$ from the reference image $I_r$ and a target patch $Y_t^q$ from another view image $I_q$ are compared. $N_m$ and $N_t$ features have been extracted from the two local patches, $Y_m^r$ and $Y_t^q$ respectively. The objective is to find the corresponding feature point in the target patch $Y_t^q$ for each point in the model patch $Y_m^r$ so that they share similar spatial structure.

Let $P_{m,i}^r$ be the $i_{th}$ point of the model patch $Y_m^r$, and let $P_{t,i}^q$ be the $i_{th}$ point of the target patch $Y_t^q$. The matching problem can be formulated as looking for an $N_m * N_t$ assignment matrix X in the following maximization over the set Ω of assignment matrices:

$$\max_X \sum_{i_1, i_2, j_1, j_2} H_{i_1, i_2, j_1, j_2} X_{i_1, i_2} X_{j_1, j_2},$$  Eq. (5)

$$X \in \Omega,$$

where $i_s$ (s=1 . . . $N_m$) and $j_s$ (s=1 . . . $N_t$) are point indices. $H_{i_1, i_2, j_1, j_2}$ is the potential corresponding to the pairs of points $(P_{m,i_1}^r, P_{t,j_1}^q)$ from the model patch $Y_m^r$ and $(P_{m,i_2}^r, P_{t,j_2}^q)$ from the target patch $Y_t^q$. The set Ω of assignment matrices can be defined as follows:

$$\Omega = \left\{ X \in \{0, 1\}^{N_m \times N_t}, \sum_{i_1} X_{i_1, i_2} = 1 \right\}$$  Eq. (6)

where $X_{i_1, i_2} = 1$, when $P_{m,i_1}^r$ is matched to $P_{t,i_2}^q$, and $X_{i_1, i_2} = 0$ otherwise. This definition puts constraints on the row and the sum of each column. That is, there is only one point in the target patch $Y_t^q$ that matches to a point in the model patch $Y_m^r$, but there may be more points in the target patch $Y_t^q$ corresponding to one point in the model patch $Y_m^r$. In embodiments, one-to-one mapping between these two image patches can be made by switching the matching order of the images and taking the intersection of matchings. This optimization may be relaxed to the set of matrices with Frobenius norm $\|X\|_F$ equal to $N_t^{1/2}$:

$$\max_{\|X\|_F^{1/2}} \sum_{i_1, i_2, j_1, j_2} H_{i_1, i_2, j_1, j_2} X_{i_1, i_2} X_{j_1, j_2},$$  Eq. (7)

$$X \in \Omega$$

This equation can be rewritten as:

$$\max_{\|X\|_F^{1/2}} X^T H X \qquad \text{Eq. (8)}$$

where X is an $N_m N_t$ vector, and H is an $N_m N_t$ by $N_m N_t$ symmetric matrix. This represents a classical Rayleigh quotient problem. The solution is $N_t^{1/2}$ times the main eigenvector, which is the eigenvector associated with the largest eigenvalue of the matrix X.

Most previous research has used pairwise geometric comparison to find correspondences. The distances between points and the combination of the distances and angles has been previously used. The higher-order models have been recently explored in current works. For example, the feature correspondences has been formulated as a hypergraph matching problem. Duchenne et al. in *Proc. of IEEE Conf. on Computer Vision and Pattern Recognition*, 1980-1987 (2009), which is incorporated by reference herein in its entirety, have generalized the idea of spectral matching and use a tensor-based algorithm for high-order graph matching, which compares tuples of points by adding high-order terms in Eq. 5 as follows:

$$\max_X \sum_{i_1,i_2,j_1,j_2,k_1,k_2} H_{i_1,i_2,j_1,j_2,k_1,k_2} X_{i_1,i_2} X_{j_1,j_2} X_{k_1,k_2} \qquad \text{Eq. (9)}$$

Similarly, $X_{i_1,i_2} X_{j_1,j_2} X_{k_1,k_2} = 1$, when the points $i_1, j_1, k_1$ in $Y_m^r$ are all matched to the points $i_2, j_2, k_2$ in $Y_t^q$, and 0 otherwise. In embodiments, a power iteration method is used to find the optimum of Eq. (9) as in the method presented in the next paragraph, below. One skilled in the art shall recognize that variants to the method, below, exist and are considered part of the current disclosure.

In embodiments, a supersymmetric tensor power iteration (third order) may be performed as follows. The input is a supersymmetric tensor H, and the output is V, the main eigenvector of H. The main eigenvector, V, is initialized randomly. Then, the following steps are repeatedly performed until convergence:

$V \leftarrow H \otimes_1 V \otimes_2 V$ (i.e., $\forall i, v_i \leftarrow \Sigma_{i,j,k} h_{i,j,k} v_j v_k$)

$V \leftarrow V / \|V\|_2$

One skilled in the art shall recognize that variants to this method exist and are considered part of the current disclosure.

3. Edge/Contour Detection and Correspondence Finding

Figure 4:
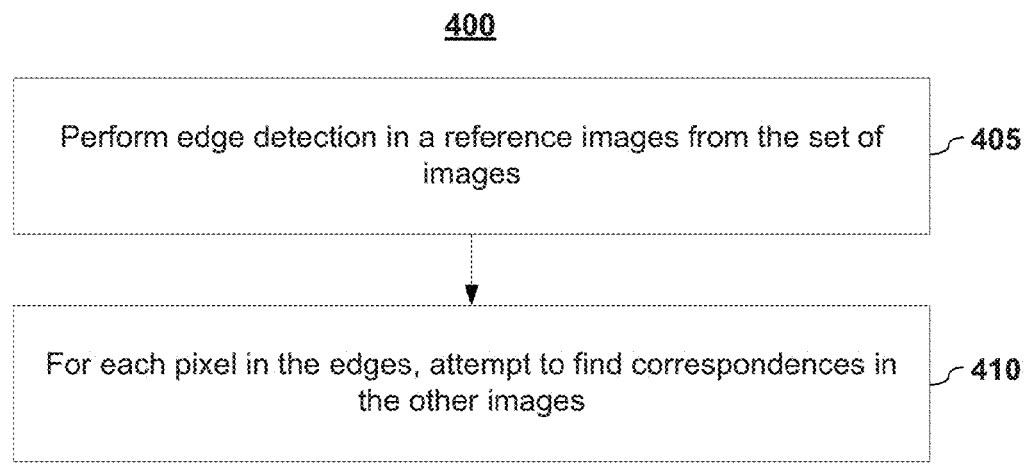
FIG. 4 depicts a method for obtaining additional correspondences between a reference image of a scene taken from one view and one or more images taken from different views of the scene according to various embodiments of the invention.

FIG. 4 depicts a method for obtaining additional correspondences between a reference image of a scene taken from one view and one or more images taken from different views of the scene according to various embodiments of the invention. The method depicted in FIG. 4 begins by performing (405) edge detection in the reference images to identify the edge/contour pixels. In embodiments, the edges/contours are detected from the reference image, $I_r$, by Canny edge detector. However, other edge detector methods may be employed. It shall be noted that edge and contour pixels are used interchangeably herein and each term shall be construed to cover both.

Figure 5A:
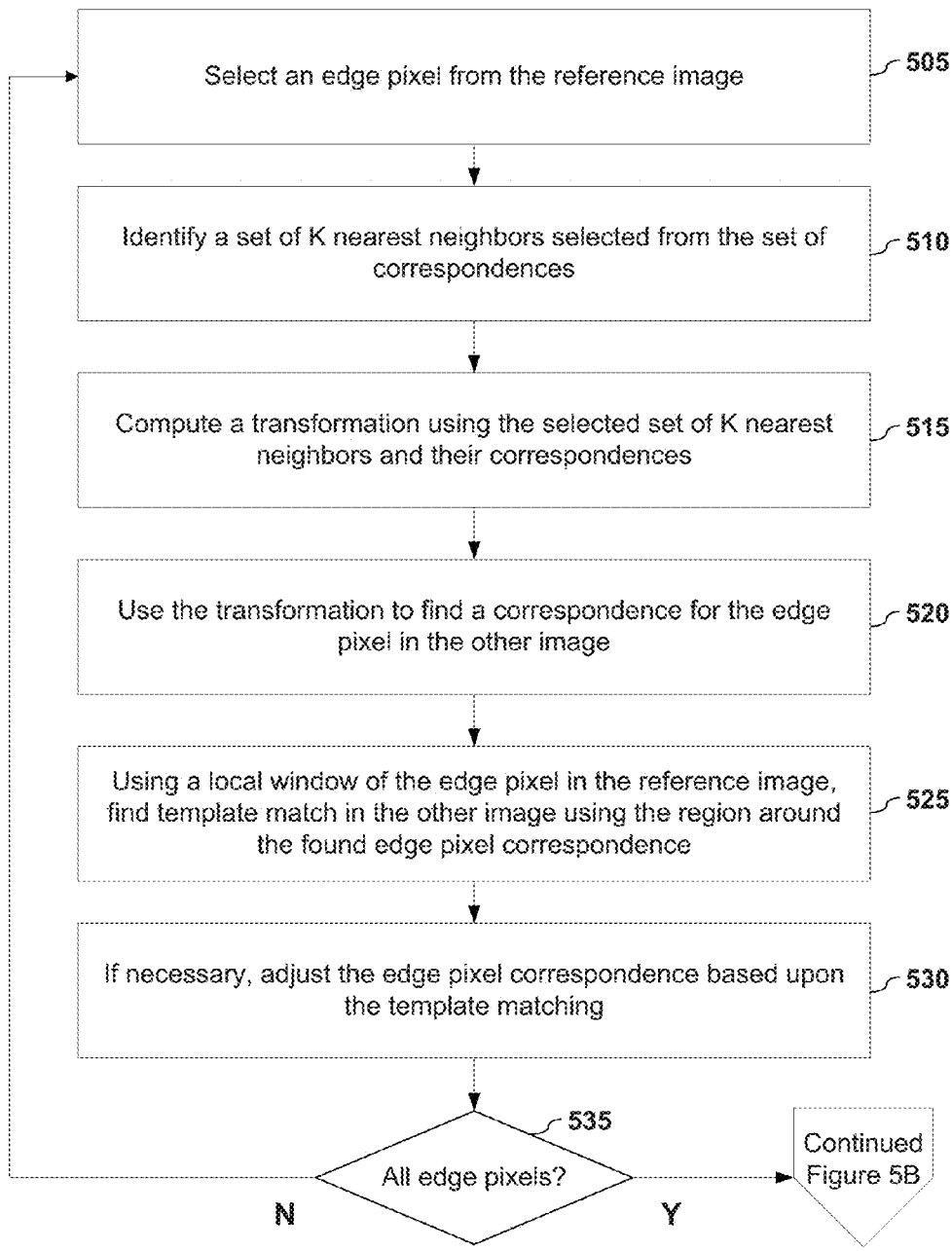
FIGS. 5A and 5B depict a method for obtaining additional correspondences between a reference image of a scene taken from one view and one or more images taken from different views of the scene according to various embodiments of the invention.
Figure 5B:
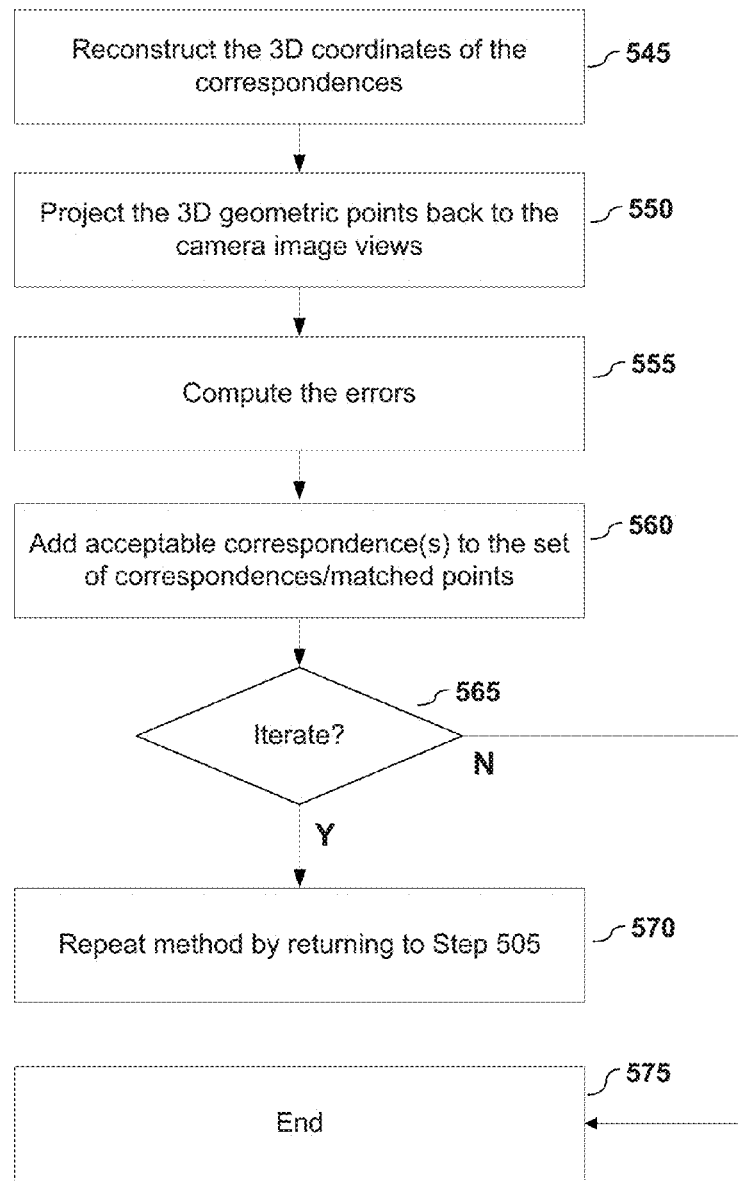

For each pixel in the edges/contours of the reference image, correspondences are found (410) in the other images. Depending upon the view and other factors, such as occlusion, some of the images may not have some of the correspondences. One skilled in the art shall recognize that the correspondence may be identified in a number of ways. FIGS. 5A and 5B depict an embodiment of a method for finding correspondences among the image views using context information, according to various embodiments of the invention.

FIGS. 5A and 5B depict a method for obtaining additional correspondences between a reference image of a scene taken from one view and one or more images taken from different views of the scene according to various embodiments of the invention. An objective of the depicted method is to reconstruct the three-dimensional (3D) points with the pixels in the contours of the reference image $I_r$ and their correspondences in the other image views $I_q$, where $q = 1 \ldots n$, $q \neq r$.

As depicted in FIG. 5A, the method commences by selecting (505) an edge/contour pixel from the reference image. For that edge/contour pixel, a set of feature point correspondences are selected from the set of correspondences to define a local context region for the edge pixel. In embodiments, a set of local correspondences for the selected edge/contour pixel in the reference image, $I_r$, are selected (510) from the set of correspondences previously obtained by searching for the K nearest matched neighbors $x_{r,i}^k$ (for instance, by way of example and not limitation, K=20) for the selected edge pixel $x_{r,i}$ based on Euclidean distances.

Given the K nearest matched neighbors, we have the corresponding features $x_{q,i}^l$ from the other images $I_q$. Initially, the set of correspondences from which the local correspondences are selected is only the correspondences found from the feature point detection and mapping; however, in embodiments, as additional correspondences are identified, these correspondences can be added to the set of correspondences and thereby help improve the accuracy of the matching.

It should be noted that the following steps 515-530 are described with respect to a single other image view; however, in embodiments, when there are a plurality of other image views, steps 515-530 may be performed for each of the other image views.

Given the local set of correspondences in the reference image (i.e., the K nearest matched neighbors of the edge pixel in the reference image) and their corresponding points in a target other view image, a transformation is computed (515). In embodiments, a linear transformation, such as Iterative Closest Point (ICP) methods may be employed. However, one skilled in the art shall recognize that other transformations may be employed.

In embodiments, the global translation t, scale s, and rotation R can be estimated as follows:

$$t = 1/K \sum_{k=1}^{K} x_{q,i}^k - 1/K \sum_{k=1}^{K} x_{r,i}^k \qquad \text{Eq. (10)}$$

$$\min_{s,R} \sum_{i=1}^{K} \|x_{q,i}^k - s * R * (x_{r,i}^k + t)\|_2^2 \qquad \text{Eq. (11)}$$

Given the global translation t, scale s, and rotation R, the correspondence $x_{q,i}$ of the edge pixel may be determined in the target image from Eq. (12).

$$x_{q,i} = s * R * x_{r,i} + t \qquad \text{Eq. (12)}$$

Because the matched features may be sparse, the estimated correspondence may be coarse and not very accurate. One way to improve the estimated correspondence is by using (525) a local window of the edge pixel in the reference image to find a template match in the target image using a local window around the estimated edge pixel correspondence. Thus, in embodiments, we can use matched and/or un-matched features around the edge pixel $x_{r,i}$ in the reference image and the estimated corresponding edge pixel $x_{q,i}$ in a neighbor window (e.g., an 11×11 window), and established fine correspondences by the method in the previous section related to feature matching. In embodiments, template matching may be performed using SSD (sum of squared difference), ASD (average of squared difference), or other template matching methods. The global translation t, scale s, and rotation R can be re-computed using these correspondences by using Eq. (10) and Eq. (11), which in turn, the location of corresponding edge pixel $x_{q,i}$ can be re-estimated using Eq. (12). If the location of the newly estimated corresponding edge pixel $x_{q,i}$ has changed from the prior estimated corresponding edge pixel location, the new location of $x_{q,i}$ is used (530) as the correspondence for the edge pixel in the reference image.

In the depicted embodiment, steps 505-530 are repeated (535) until all of the edge pixels in the reference image have been processed. However, as noted below, one skilled in the art will recognize that other configuration may also be successfully employed and as such fall within the scope of this disclosure.

After performing the above steps, the correspondences have been established in the other input view(s) $I_q$, to the extent a correspondence exists in a view, for each pixel in the contours of the reference image $I_r$. Given the projection matrices $P_q$ of the image views, a three-dimensional (3D) point $X_{r,i}$ corresponding to $x_{r,i}$ can be computed (545) by the following over-determined system using singular value decomposition (SVD):

$$(x_{q,i}P_{q,3} - P_{q,1})X = 0$$

$$(x_{q,i}P_{q,3} - P_{q,2})X = 0, q = 1 \ldots n \quad \text{Eq. (13)}$$

where X is the reconstructed point, and $P_{q,j}$ is the j row of the projection matrix $P_q$. The accuracy of reconstruction can be measured by projecting (550) the three-dimensional (3D) point $X_{r,i}$ to the input views and computing (555) an error $\epsilon$.

Figure 6:
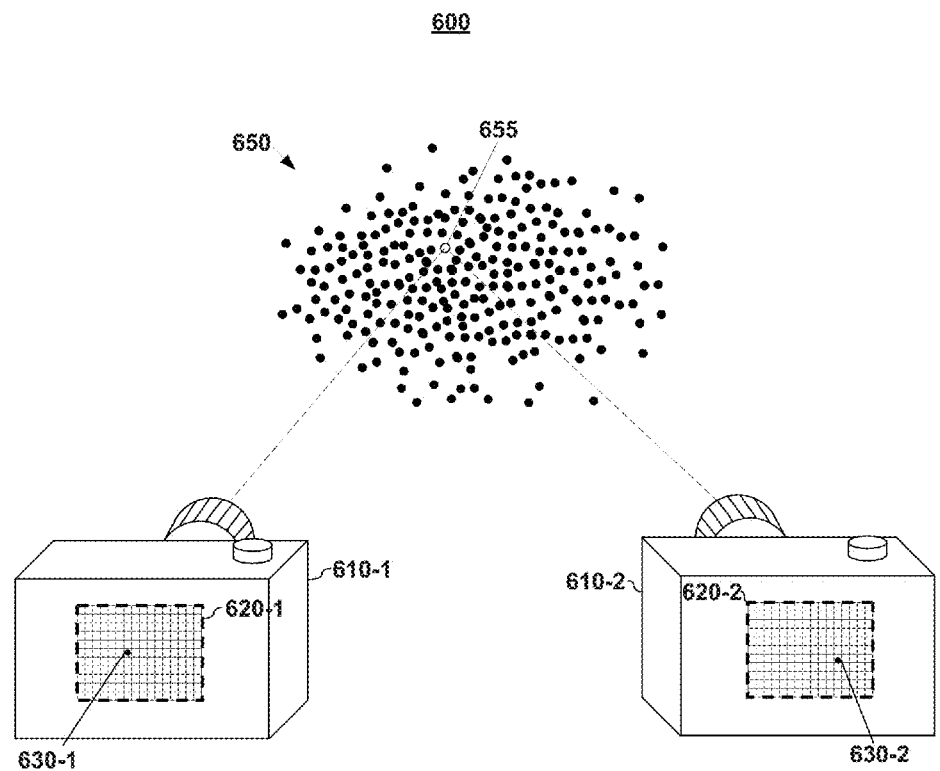
FIG. 6 graphically depicts projecting three-dimensional points to two camera views according to various embodiments of the invention.

FIG. 6 graphically depicts projecting a three-dimensional point to two camera views according to various embodiments of the invention. Depicted in FIG. 6 are a set of reconstructed three-dimensional points $X_{r,i}$ 650 and two cameras 610-1 and 610-2. Only two cameras are depicted for purposes of simplification, more views could be present. A reconstructed three-dimensional point 655 is projected back to each of the camera views 620-1 and 620-2. The projected reconstructed three-dimensional point 655 will have a location 630-1 and 630-2 in each of the camera views 620-1 and 620-2, respectively. This location can be compared with the initial location to compute an error.

In embodiments, the error may be computed as depicted in Eq. (14):

$$\varepsilon = 1/n \sum_{q=1}^{n} (x_{q,i} - P_q X_{q,i}) \quad \text{Eq. (14)}$$

If the error is smaller than a threshold value, which value may be user-defined, the correspondences $x_{q,i}$ (q=1 . . . n) can be added (560) to the correspondence lists. And, in embodiments, if the error is greater than the threshold value, the correspondences are ignored.

In embodiments, because the number of correspondences among different views are increasing, the accuracy of reconstruction can be improved by iterating (565/570) the process set forth in FIGS. 5A and 5B until a stop condition has been met (565/575). A stop condition may be, for example, that there is little or no improvement in the error, that the error is below a threshold, and/or that a number of iterations has been reached. In embodiments, upon iterating, the linear transformation of Eq. (11) can be estimated in a smaller window and improve its accuracy, which in turn improves the accuracy of reconstruction.

One skilled in the art shall recognize that the steps above may be reordered, rearranged, and/or configured with different iterations, more iterations, or fewer iterations but can still achieve the same or similar results. For example, by way of illustration and not limitation, steps 515-530 may be performed for each edge pixel in the reference image relative to one other image view and then iterated for another image and so forth until all the other image views have been processed; alternatively, steps 515-530 may be performed for each edge pixel in the reference image relative to each other image view and then iterated for another edge pixel and so forth until all of the edge pixels have been processed. It shall be noted that one skilled in the art could configure the process in a number of ways without departing from the spirit of the disclosure and that such alternative configurations are within the scope of the present invention.

4. Rendering a Novel View

Given the set of reconstructed points, a novel view can be rendered using a view interpolation method. In embodiments, a view interpolation method may be unstructured lumigraph rendering but other view interpolation methods may also be employed. In embodiments, a novel view interpolation method reconstructs each pixel of the desired novel image by a weighted average of the corresponding pixels in each weighted input images. In embodiments, the weights are computed based on the penalties of angle similarity. In embodiments, a resolution penalty and field-of-view penalty for weight calculation are not considered.

Figure 7:
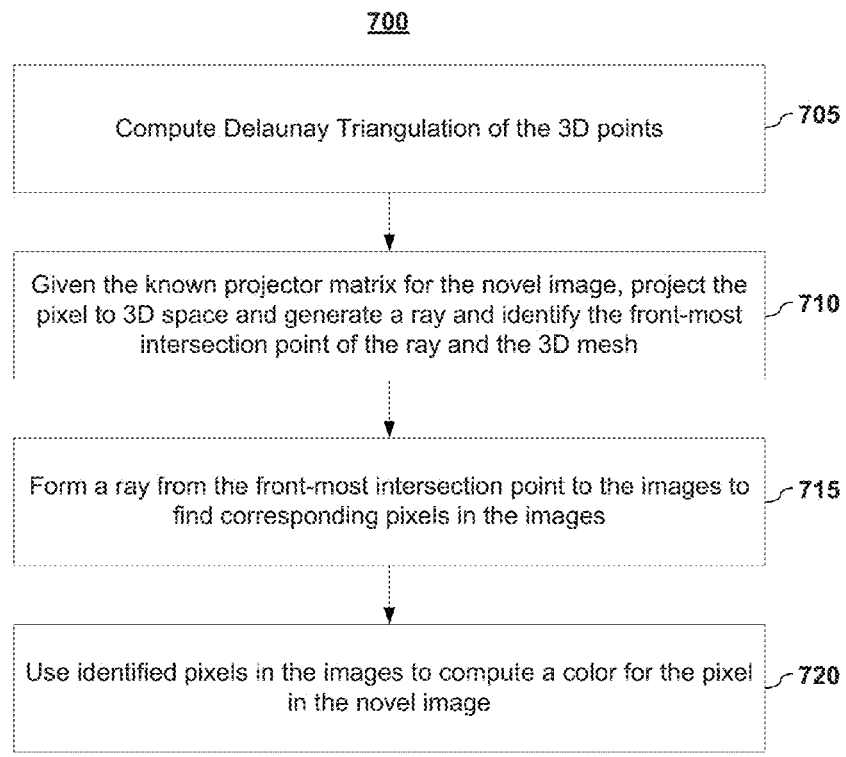
FIG. 7 depicts a method for rendering a novel view according to various embodiments of the invention.
Figure 8:
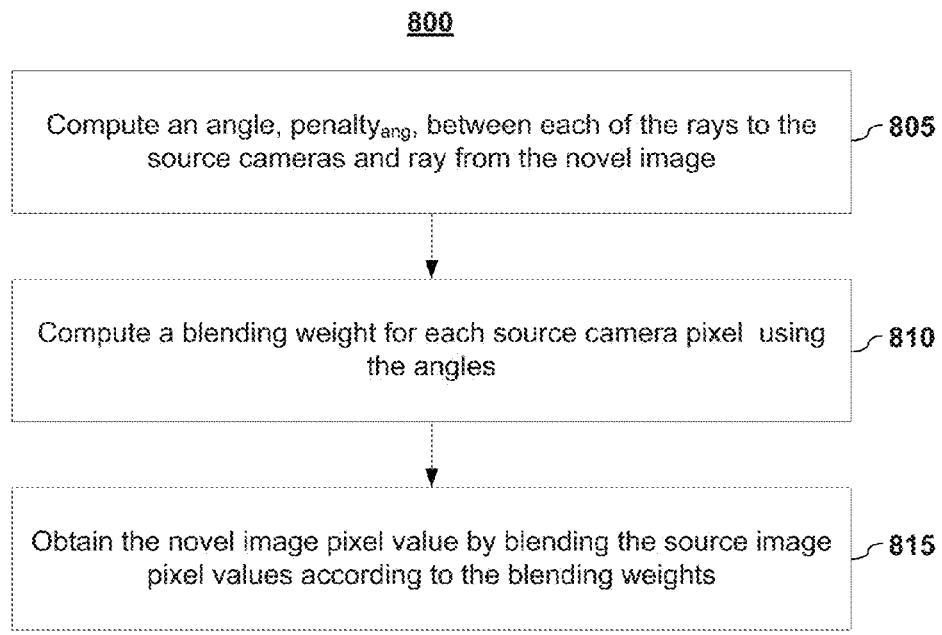
FIG. 8 depicts a method for blending pixel color values to obtain pixel color values for a novel view image according to various embodiments of the invention.

FIG. 7 depicts a method for rendering a novel view according to various embodiments of the invention. The method is depicted with respect to one pixel of the novel view image and can be repeated (serially, concurrently, or a combination thereof) for each image pixel in the novel image. Given the set of reconstructed points, a proxy mesh can be created (705) by Delaunay triangulation. Given the known projector matrix for the novel view, each pixel of the desired novel view is projected (710) to three-dimensional (3D) space, thereby generating a desired ray $r_d$, which intersects the proxy mesh at some front-most point p. A ray, $r_i$, from the front-most intersection point p to the centers of each source camera $C_i$ is formed (715). The rays $r_i$ will intersect the source view images at a pixel. The color values of the identified pixel in the images are used (720) to compute a color for the pixel in the novel image. FIG. 8 depicts a method for computing a color value for the novel image pixel based upon the other images according to various embodiments of the invention.

FIG. 8 depicts a method for blending pixel color values to obtain pixel color values for a novel view image according to various embodiments of the invention. An angle, penalty$_{ang}$(i), is computed (805) between each of the rays from the intersection point, p, to the source cameras and the ray from the novel image. An angle, penalty$_{ang}$(i), is defined as the difference between $r_i$ and $r_d$, as shown in FIG. 9.

Figure 9:
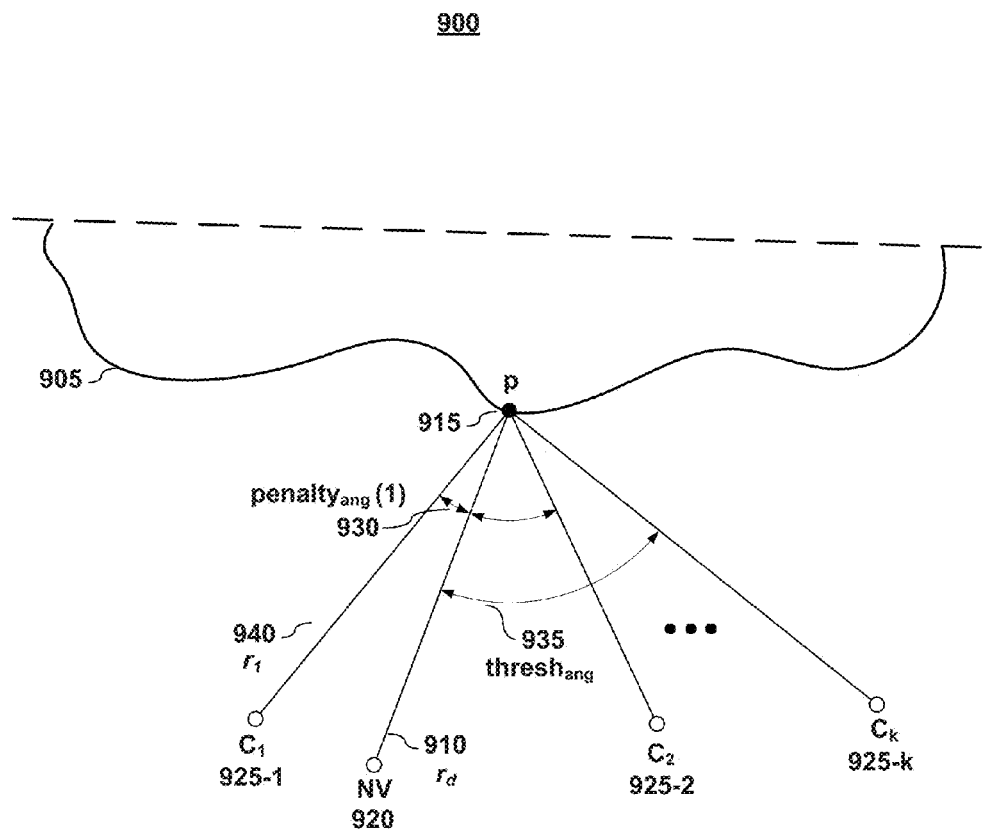
FIG. 9 illustrates determining angles of rays for use in blending pixel colors according to various embodiments of the invention.

FIG. 9 illustrates determining angles of rays for use in blending pixel colors according to various embodiments of the invention. Depicted in FIG. 9 is a portion of the proxy mesh 905 formed from reconstructed three-dimensional points. A ray 910 ($r_d$) projected from a pixel in the desired novel view 920 intersects the mesh 905 at point p 915. Rays (e.g., $r_1$ 940) are projected from point p 915 to the centers of the other image views ($C_1$-$C_k$ 925). An angle, $penalty_{ang}(i)$, is computed between each of the rays from the intersection point, p, to the source cameras and the ray from the novel image. For example, $penalty_{ang}(1)$ 930 is the angle between $r_1$ 940 and $r_d$ 910 as shown in FIG. 9. The largest angle value of $penalty_{ang}(i)$ in the set of K-nearest cameras is set as $thresh_{ang}$ 935. In embodiments, the blending weight can be computed and normalized as follows:

$$w_{ang}(i) = 1 - \frac{penalty_{ang}(i)}{thresh_{ang}} \qquad \text{Eq. (15)}$$

$$\tilde{w}_{ang}(i) = \frac{w_{ang}(i)}{\sum_{j=1}^{k} w_{ang}(j)} \qquad \text{Eq. (16)}$$

Thus, the novel view image can be as follows:

$$I = \sum_{i=1}^{k} \tilde{w}_{ang}(i) I_{C_i} \qquad \text{Eq. (17)}$$

C. Experimental Results

To demonstrate the ability of the methods described above to deal with a number of challenges, these methods were applied to different kinds of scenes. These scenes contained homogeneous as well as textured objects, large view variation, partial occlusion, and fuzz. With the experiments, it was intended to show that, due to the context cue, these approaches can handle these scenes without the need of manual point correspondences.

Figure 10:
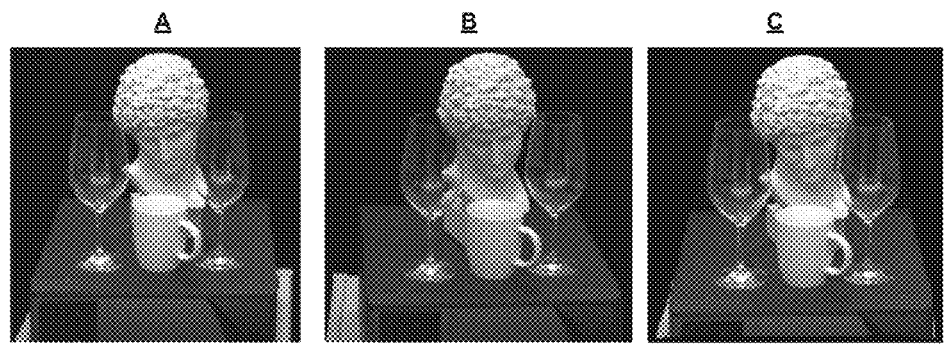
FIGS. 10-14 illustrates example novel view images according to various embodiments of the invention.
Figure 11:
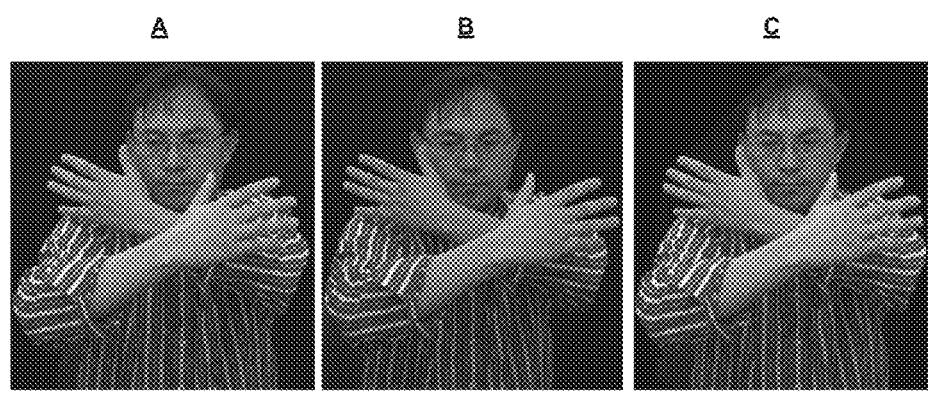

FIG. 10 shows a new view of the textureless or transparent scenes, which has not been done with the previous works. FIGS. 10A and 10B are the input images and FIG. 10C is the new view image rendered according to the teachings of the present disclosure. FIG. 11 demonstrates that the present invention can work well on scenes of partial occlusion. FIGS. 11A and 11B are the input images and FIG. 11C is the new view image rendered according to the teachings. Note that application of the present invention is able to reconstruct the color in the occluded regions (e.g., clothes between fingers, and face behind hands).

Figure 12:
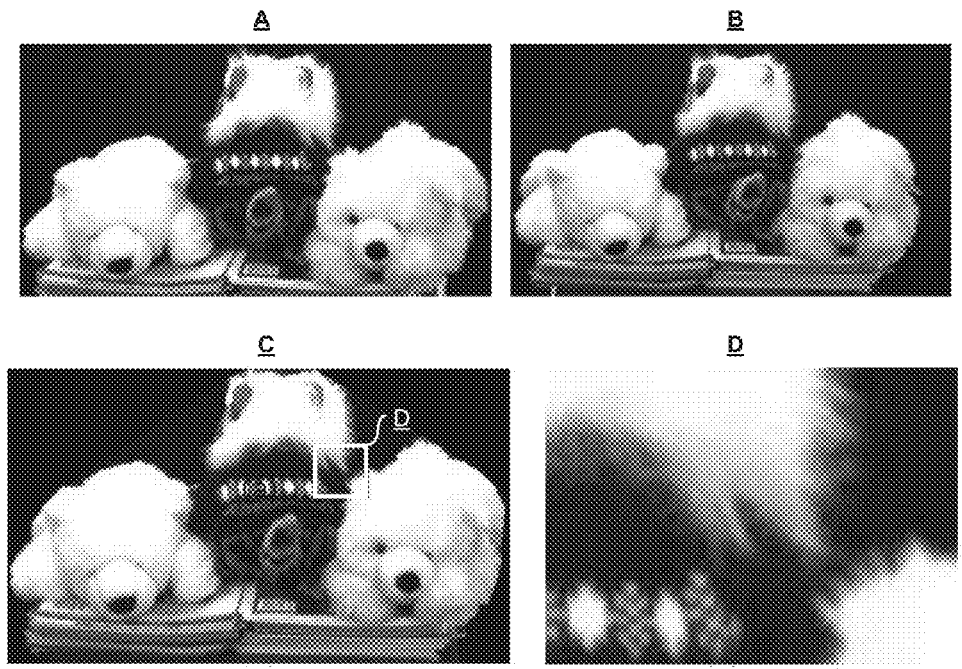
Figure 14:

It can be seen that the methods of the present disclosure can synthesize the new view from the complex structures of the natural world, such as fur in FIG. 12 and flowers in FIG. 14. As shown in FIG. 14, the present invention can use the input images (FIGS. 14A and 14B) to interpolate a new view (FIG. 14C) and do well on the sharp edges and preserving the fine details and in dealing with small occlusions (FIGS. 14D and 14E). In contrast to prior approaches, prior methods produced results with some missing, jagged artifacts around the edges of foreground objects.

Figure 13:
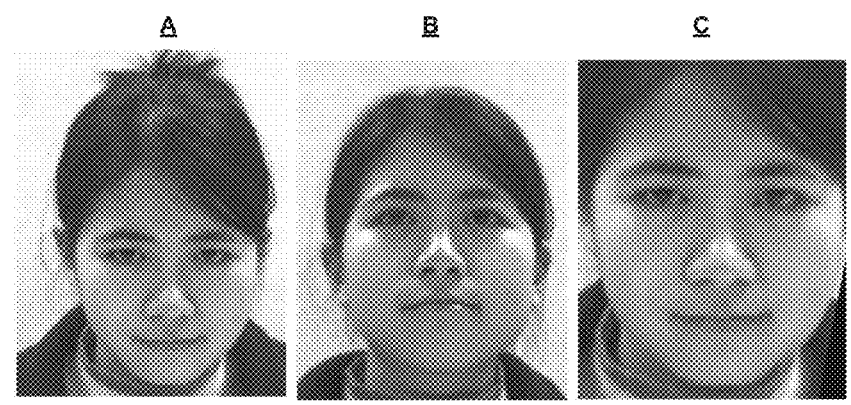

FIG. 13 shows that the present invention can be applied to wide baseline eye-gaze correction. In contrast to prior approaches, application of the teachings of the present disclosure can generate more realistic views and have little or no artifacts on the facial boundary. Furthermore, eye contact is more obvious in synthesized view rendered according to the teachings of the present disclosure.

D. System Embodiments

FIG. 1 illustrates a novel view interpolation system 100 according to various embodiments of the present invention. Depicted is a computing system 120 communicatively coupled to one or more cameras 110. In embodiments, a computing system may be configured to perform one or more of the methods presented herein. In embodiments, systems that implement at least one or more of the methods described herein may comprise a novel view interpolation application operating on a computer system that interfaces with or receives data from (directly and/or indirectly) a (still image and/or video) camera or cameras and/or from one or more data storage devices. The computer system may comprise one or more computers and may include one or more databases.

It shall be noted that the present invention may be implemented in any instruction-execution/computing device or system capable of processing image data, including without limitation, a general-purpose computer and a specific computer, such as one intended for data or image processing. It shall be noted that aspects of the present invention may also be implemented into other computing devices and systems, including without limitation, a camera, a projector, a multimedia device, and any other device that projects, processes, captures, transmits, or stores an image. Furthermore, within any of the devices, aspects of the present invention may be implemented in a wide variety of ways including software, hardware, firmware, or combinations thereof. For example, the functions to practice various aspects of the present invention may be performed by components that are implemented in a wide variety of ways including discrete logic components, one or more application specific integrated circuits (ASICs), and/or program-controlled processors. It shall be noted that the manner in which these items are implemented is not critical to the present invention.

Figure 15:
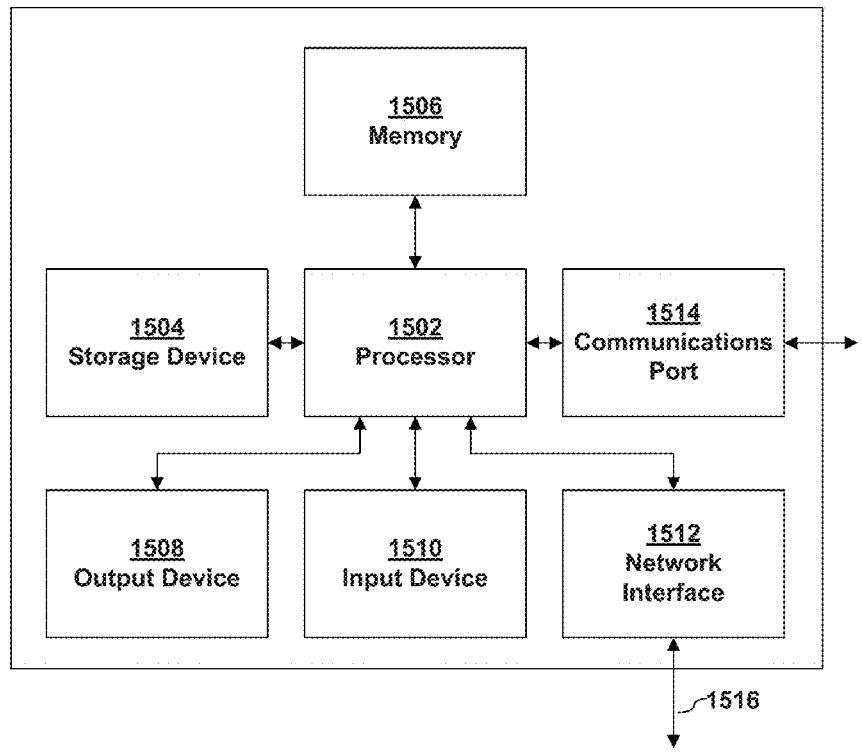
FIG. 15 depicts a computing system according to various embodiments of the invention.

FIG. 15 depicts a functional block diagram of an embodiment of an instruction-execution/computing device 1500 that may implement or embody embodiments of the present invention. As illustrated in FIG. 15, a processor 1502 executes software instructions and interacts with other system components. In an embodiment, processor 1502 may be a general purpose processor such as (by way of example and not limitation) an AMD processor, an INTEL processor, a SUN MICROSYSTEMS processor, or a POWERPC compatible-CPU, or the processor may be an application specific processor or processors. A storage device 1504, coupled to processor 1502, provides long-term storage of data and software programs. Storage device 1504 may be a hard disk drive and/or another device capable of storing data, such as a computer-readable media (e.g., diskettes, tapes, compact disk, DVD, and the like) drive or a solid-state memory device. Storage device 1504 may hold programs, instructions, and/or data for use with processor 1502. In an embodiment, programs or instructions stored on or loaded from storage device 1504 may be loaded into memory 1506 and executed by processor 1502. In an embodiment, storage device 1504 holds programs or instructions for implementing an operating system on processor 1502. In one embodiment, possible operating systems include, but are not limited to, UNIX, AIX, LINUX, Microsoft Windows, and the Apple MAC OS. In embodiments, the operating system executes on, and controls the operation of, the computing system 1500.

An addressable memory 1506, coupled to processor 1502, may be used to store data and software instructions to be executed by processor 1502. Memory 1506 may be, for example, firmware, read only memory (ROM), flash memory, non-volatile random access memory (NVRAM), random access memory (RAM), or any combination thereof. In one embodiment, memory 1506 stores a number of software objects, otherwise known as services, utilities, components, or modules. One skilled in the art will also recognize that storage 1504 and memory 1506 may be the same items and function in both capacities. In an embodiment, one or more of the methods depicted herein may be embodied in one or more modules stored in a computer readable media, such as memory 1504, 1506 and executed by processor 1502.

In an embodiment, computing system 1500 provides the ability to communicate with other devices, other networks, or both. Computing system 1500 may include one or more network interfaces or adapters 1512, 1514 to communicatively couple computing system 1500 to other networks and devices. For example, computing system 1500 may include a network interface 1512, a communications port 1514, or both, each of which are communicatively coupled to processor 1502, and which may be used to couple computing system 1500 to other computer systems, networks, and devices.

In an embodiment, computing system 1500 may include one or more output devices 1508, coupled to processor 1502, to facilitate displaying graphics and text. Output devices 1508 may include, but are not limited to, a display, LCD screen, CRT monitor, printer, touch screen, or other device for displaying information. Computing system 1500 may also include a graphics adapter (not shown) to assist in displaying information or images on output device 1508.

One or more input devices 1510, coupled to processor 1502, may be used to facilitate user input. Input device 1510 may include, but are not limited to, a pointing device, such as a mouse, trackball, or touchpad, and may also include a keyboard or keypad to input data or instructions into computing system 1500.

In an embodiment, computing system 1500 may receive input, whether through communications port 1514, network interface 1512, stored data in memory 1504/1506, or through an input device 1510, from a scanner, copier, facsimile machine, projector, camera, sensors, or other computing device.

One skilled in the art will recognize no computing system is critical to the practice of the present invention. One skilled in the art will also recognize that a number of the elements described above may be physically and/or functionally separated into sub-modules or combined together.

It shall be noted that embodiments of the present invention may further relate to computer products with a computer-readable medium that have computer code thereon for performing various computer-implemented operations. The media and computer code may be those specially designed and constructed for the purposes of the present invention, or they may be of the kind known or available to those having skill in the relevant arts. Examples of computer-readable media include, but are not limited to: magnetic media such as hard disks, floppy disks, and magnetic tape; optical media such as CD-ROMs and holographic devices; magneto-optical media; and hardware devices that are specially configured to store or to store and execute program code, such as application specific integrated circuits (ASICs), programmable logic devices (PLDs), flash memory devices, and ROM and RAM devices. Examples of computer code include machine code, such as produced by a compiler, and files containing higher level code that are executed by a computer using an interpreter. Embodiments of the present invention may be implemented in whole or in part as machine-executable instructions that may be in program modules that are executed by a computer. Examples of program modules include libraries, programs, routines, objects, components, and data structures. In distributed computing environments, program modules may be physically located in settings that are local, remote, or both.

It will be appreciated to those skilled in the art that the preceding examples and embodiment are exemplary and not limiting to the scope of the present invention. It is intended that all permutations, enhancements, equivalents, combinations, and improvements thereto that are apparent to those skilled in the art upon a reading of the specification and a study of the drawings are included within the spirit and scope of the present invention. It is therefore intended that the following claims include such modifications, permutation, and equivalents as fall within the spirit and scope of the present invention.

What is claimed is:

1. A computer program product embodying a non-transient computer readable medium containing instructions to generate a new view of a scene by performing the steps comprising:
   (a) accessing a plurality of images of the scene, each image in said plurality of images having a different view of said scene, one image in said plurality of images being a reference image and the remaining images in said plurality of images constituting a set of images;
   (b) forming a separate set of corresponding features points between the reference image and at least one of the images in the set of images, the separate sets of corresponding features points together forming a set of correspondences;
   (c) detecting edge pixels in the reference image;
   (d) adjusting at least one selected set of corresponding features points by:
      (i) for each selected edge pixel taken from the detected edge pixels in the reference image, defining a window around the selected edge pixel in the reference image and identifying a set of local correspondences, said local correspondences including corresponding feature points of the selected set of corresponding features points that are within the window, computing a transformation of the selected edge pixel and its set of local correspondences, using the transformation on the corresponding feature points of each corresponding image in said set of images as defined by the selected set of corresponding features points to identify a matching pixel in the corresponding image that matches the selected edge pixel;
      (ii) checking the validity of the selected edge pixel and its matching pixel, and responsive to the validity being acceptable, adding the selected edge pixel and its matching pixel to the set of correspondences; and
   (e) using the set of correspondences to generate the new view of the scene that contains image information not found in the accessed plurality of images of the scene of step (a).

2. The computer program product of claim 1, wherein step (i) includes:
   for each selected edge pixel:
   identifying from within the window in the reference image, a set of nearest neighbor pixels selected from the set of correspondences; and
   for each corresponding image of the set of images:
   applying the transformation to the selected edge pixel in the reference image to obtain a transform pixel in the corresponding image from the set of images; and
   template matching the window in the reference image that includes the edge pixel with a local window in the corresponding image that includes the transform pixel to identify a corresponding pixel in the corresponding image that corresponds to the edge pixel in the reference image, wherein the corresponding pixel is deemed the matching pixel.

3. The computer program product of claim 1 wherein step (ii) includes:
    accessing a three-dimensional point-representation of the scene generated by using the set of correspondences;
    projecting the selected edge pixel to the three-dimensional point-representation to identify a surface point on the three-dimensional point-representation, projecting the identified surface point to at least some of the images in the set of images;
    computing an error value of the projected identified surface point on said least some of the images in the set of images; and
    responsive to the error value being less than a threshold value, adding the selected edge pixel and its matching pixel to the set of correspondences.

4. The computer program product of claim 3 wherein the step of computing an error value of the projected surface point comprises:
    for each of said least some of the images in the set of images, computing an offset value between the projected surface point on said least some of the images in the set of images and its corresponding matching pixel in said least some of the images in the set of images; and
    averaging the offset values to obtain the error value.

5. The computer program product of claim 1, wherein the view of each of said a plurality of images is from a different angle to the scene.

6. A hardware computing system for generating a novel view of a scene, the system comprising:
    one or more communication interfaces for receiving a reference image of the scene and a set of images of the scene, said reference image and said set of images being taken at different views of the scene;
    one or more data processors, wherein execution of one or more sequences of instructions by one or more processors causes the one or more processors to generate a novel view of the scene by performing the steps comprising:
    (a) forming a separate set of corresponding feature points between the reference image and at least one of the images in the set of images, the separate sets of corresponding features points together forming a set of correspondences;
    (b) detecting edge pixels in the reference image;
    (c) adjusting at least one selected set of corresponding features points by:
        (i) for each selected edge pixel taken from the detected edge pixels in the reference image, defining a window around the selected edge pixel in the reference image and identifying a set of local correspondences, said local correspondences including corresponding feature points of the selected set of corresponding features points that are within the window, computing a transformation of the selected edge pixel and its set of local correspondences, using the transformation on the corresponding feature points of each corresponding image in said set of images as defined by the selected set of corresponding features points to identify a matching pixel in the corresponding image that matches the selected edge pixel;
        (ii) checking the validity of the selected edge pixel and its matching pixel, and responsive to the validity being acceptable, adding the selected edge pixel and its matching pixel to the set of correspondences; and
    (d) using the set of correspondences to generate the new view of the scene that contains image information not found in the set of images of the scene.

7. The system of claim 6 wherein step (i) includes:
    for each selected edge pixel:
    identifying from within the window in the reference image, a set of nearest neighbor pixels selected from the set of correspondences; and
    for each corresponding image of the set of images:
    applying the transformation to the selected edge pixel in the reference image to obtain a transform pixel in the corresponding image from the set of images; and
    template matching the window in the reference image that includes the edge pixel with a local window in the corresponding image that includes the transform pixel to identify a corresponding pixel in corresponding image that corresponds to the edge pixel in the reference image, wherein the corresponding pixel is deemed the matching pixel.

8. The system of claim 6 wherein step (ii) includes:
    accessing a three-dimensional point-representation of the scene generated by using the set of correspondences;
    projecting the selected edge pixel to the three-dimensional point-representation to identify a surface point on the three-dimensional point-representation, projecting the identified surface point to at least some of the images in the set of images;
    computing an error value of the identified surface point on said least some of the images in the set of images; and
    responsive to the error value being less than a threshold value, adding the selected edge pixel and its matching pixel to the set of correspondences.

9. The system of claim 8 wherein the step of computing an error value of the projected surface point comprises:
    for each of said least some of the images in the set of images, computing an offset value between the projected surface point and its corresponding matching pixel in said least some of the images in the set of images; and
    averaging the offset values to obtain the error value.

10. The system of claim 6, wherein the view of each of said a plurality of images is from a different angle to the scene.

11. The computer program product of claim 1, wherein in step (b), a separate set of corresponding features points is formed between the reference image and each images in the set of images.

12. The computer program product of claim 1, wherein in step (d), all sets of corresponding feature points are selected for adjusting using steps (i) and (ii).

13. The system of claim 6, wherein in step (a), a separate set of corresponding features points is formed between the reference image and a plurality of images in the set of images.

14. The computer program product of claim 1, wherein in step (c), a plurality of sets of corresponding feature points are selected for adjusting using steps (i) and (ii).

* * * * *